(12) United States Patent
Ravussin et al.

(10) Patent No.: US 12,076,298 B2
(45) Date of Patent: Sep. 3, 2024

(54) PHARMACY BAG WITH INTEGRATED FLUSH OPTION

(71) Applicant: B. BRAUN MELSUNGEN AG, Melsungen (DE)

(72) Inventors: Frédéric Ravussin, Lutry (CH); Michel Pittet, Aumont (CH)

(73) Assignee: B. Braun Melsungen AG, Melsungen (DE)

( * ) Notice: Subject to any disclaimer, the term of this patent is extended or adjusted under 35 U.S.C. 154(b) by 435 days.

(21) Appl. No.: 16/069,431

(22) PCT Filed: Jan. 20, 2017

(86) PCT No.: PCT/EP2017/051167
§ 371 (c)(1),
(2) Date: Jul. 11, 2018

(87) PCT Pub. No.: WO2017/125538
PCT Pub. Date: Jul. 27, 2017

(65) Prior Publication Data
US 2019/0021953 A1    Jan. 24, 2019

(30) Foreign Application Priority Data

Jan. 21, 2016   (EP) .................................. 16152307

(51) Int. Cl.
*A61J 1/20*     (2006.01)
*A61J 1/10*     (2006.01)
*A61J 1/14*     (2023.01)
*B29D 22/00*    (2006.01)
(Continued)

(52) U.S. Cl.
CPC .............. *A61J 1/2093* (2013.01); *A61J 1/10* (2013.01); *A61J 1/1475* (2013.01); *A61J 1/2024* (2015.05); *B29D 22/003* (2013.01); *B65B 3/003* (2013.01); *B65B 51/22* (2013.01)

(58) Field of Classification Search
CPC ................................. A61J 1/2093; A61J 1/10
See application file for complete search history.

(56) References Cited

U.S. PATENT DOCUMENTS

| 4,191,231 A | 3/1980 | Winchell et al. |
| 4,396,383 A | 8/1983 | Hart |
| 4,507,114 A | 3/1985 | Bohman et al. |

(Continued)

FOREIGN PATENT DOCUMENTS

| BE | 894377 A | 1/1983 |
| CN | 1133169 A | 10/1996 |

(Continued)

OTHER PUBLICATIONS

International Search Report for International Application No. PCT/EP2017/051167dated Mar. 23, 2017.

(Continued)

*Primary Examiner* — Susan S Su
*Assistant Examiner* — Meagan Ngo
(74) *Attorney, Agent, or Firm* — Christopher A. Rothe; Culhane PLLC (57) ABSTRACT

The present invention relates to a bag containing preprepared injectable drug(s) and/or diluents for injectable drugs to be administered by intravenous (IV) application to a patient, said bag having an integrated flushing option.

15 Claims, 3 Drawing Sheets

(51) Int. Cl.
  *B65B 3/00* (2006.01)
  *B65B 51/22* (2006.01)

(56) References Cited

U.S. PATENT DOCUMENTS

| | | | |
|---|---|---|---|
| 4,557,377 | A | 12/1985 | Maloney |
| 5,209,347 | A | 5/1993 | Fabisiewicz et al. |
| 5,431,496 | A | 7/1995 | Balteau et al. |
| 5,832,698 | A | 11/1998 | Huguenin |
| 5,910,138 | A * | 6/1999 | Sperko ............... B29C 65/02 |
| | | | 604/408 |
| 6,017,598 | A | 1/2000 | Kreischer et al. |
| 6,039,720 | A * | 3/2000 | Wieslander ........... A61J 1/2093 |
| | | | 206/219 |
| 6,117,123 | A | 9/2000 | Barney et al. |
| 6,468,259 | B1 | 10/2002 | Loretti et al. |
| 6,663,743 | B1 | 12/2003 | Becker et al. |
| 6,996,951 | B2 | 2/2006 | Smith et al. |
| 7,618,406 | B2 | 11/2009 | Roger |
| 7,678,097 | B1 * | 3/2010 | Peluso .............. B29C 66/1122 |
| | | | 604/412 |
| 7,938,816 | B2 | 5/2011 | Frezza |
| 9,278,049 | B2 | 3/2016 | Honda |
| 9,365,316 | B2 | 6/2016 | Flank et al. |
| 9,856,045 | B2 | 1/2018 | Wu |
| 10,232,966 | B2 | 3/2019 | Jaouen |
| 10,369,077 | B2 | 8/2019 | Naro |
| 2004/0137177 | A1 * | 7/2004 | Saito ................... B65D 31/02 |
| | | | 428/35.2 |
| 2006/0093765 | A1 * | 5/2006 | Mueller ................. B29C 65/76 |
| | | | 428/35.2 |
| 2006/0154873 | A1 | 7/2006 | Sumiyoshi et al. |
| 2007/0075714 | A1 | 4/2007 | Dollinger et al. |
| 2007/0299391 | A1 * | 12/2007 | Yoshikawa ............. A61J 1/00 |
| | | | 604/82 |
| 2008/0044606 | A1 * | 2/2008 | Omori ................. A61J 1/2093 |
| | | | 428/35.9 |
| 2009/0166363 | A1 * | 7/2009 | Balteau ................. A61J 1/2093 |
| | | | 220/523 |
| 2009/0204098 | A1 * | 8/2009 | Wieslander ......... B65D 81/3266 |
| | | | 604/416 |
| 2009/0310890 | A1 * | 12/2009 | Suzuki ............... B65D 75/5872 |
| | | | 383/38 |
| 2010/0298804 | A1 * | 11/2010 | Inoue ..................... B32B 27/08 |
| | | | 604/410 |
| 2012/0215203 | A1 * | 8/2012 | Alvey ................... A61J 1/2093 |
| | | | 604/514 |
| 2014/0072743 | A1 | 3/2014 | Stephenne et al. |
| 2014/0299221 | A1 | 10/2014 | Lopez et al. |
| 2017/0144822 | A1 | 5/2017 | Murray |
| 2019/0350810 | A1 | 11/2019 | Stefani et al. |
| 2020/0113783 | A1 | 4/2020 | Naro |
| 2022/0024616 | A1 | 1/2022 | Martinez et al. |

FOREIGN PATENT DOCUMENTS

| | | |
|---|---|---|
| CN | 1512950 A | 7/2004 |
| CN | 2742958 Y | 11/2005 |
| CN | 2822627 Y | 10/2006 |
| CN | 2822949 Y | 10/2006 |
| CN | 2822950 | 10/2006 |
| CN | 2832507 Y | 11/2006 |
| CN | 100453306 C | 1/2009 |
| CN | 202314363 U | 7/2012 |
| CN | 202376454 U | 8/2012 |
| CN | 103893012 A | 7/2014 |
| CN | 104159624 A | 11/2014 |
| CN | 204307080 U | 5/2015 |
| CN | 204521587 U | 8/2015 |
| CN | 104905963 A | 9/2015 |
| CN | 105173248 B | 12/2015 |
| DE | 102004051556 B4 | 11/2007 |
| DE | 102005028068 B4 | 7/2016 |
| EP | 0 145 825 A1 | 6/1985 |
| EP | 0 345 774 A1 | 12/1989 |
| EP | 1 330 997 A2 | 7/2003 |
| EP | 1 060 754 B1 | 8/2005 |
| EP | 1 561 448 A1 | 8/2005 |
| EP | 2 609 900 A1 | 7/2013 |
| JP | 2008067848 A | 3/2008 |
| JP | 4984228 B2 | 7/2012 |
| KR | 20060017844 A | 2/2006 |
| WO | 2004047714 A1 | 6/2004 |
| WO | 2011/019347 A1 | 2/2011 |

OTHER PUBLICATIONS

Yang Zongfa, Pharmaceutical Preparation Equipment, People's Military Medical Publishing House, Apr. 2012.

Susan E.M. Selke, Understanding Plastics Packaging Technology, Chapter 4.7(especially Figures 4.9 and 4.10), pp. 90-93; Carl Hanser Verlag, Munich 1997.

Jack Avery, Injection Molding Alternatives A Guide for Designers and Product Engineers, Chapter 8.1-Chapter 8.3; pp. 184-188; Carl Hanser Verlag, Munich 1998.

Susan E.M. Selke, Plastic packaging technology, Beijing: China Light Industry Press, Jun. 2000, pp. 86-87 (Chinese).

Jack Avery, Plastic Molding Solution Selection Design and Product Engineer's Guide, Beijing:Chemical industry Press Mar. 2004, pp. 189-191 (Chinese).

China National Intellecual Property Administration, Text Of The Rejection Decision. Office action issued on Jul. 3, 2020 in relation to application No. 201780005900.7.

Iven, "Non-PVC Infusion Bag IV Solution Production Line," http://pharm-equipment.com/2-infusion-bag-iv-solution.html, printed May 18, 2023, 8 pages.

* cited by examiner

PHARMACY BAG WITH INTEGRATED FLUSH OPTION

FIELD OF THE INVENTION

The present invention relates to a bag containing preprepared injectable drug(s) and/or diluents for injectable drugs to be administered by intravenous (IV) application to a patient, said bag having an integrated flushing option.

BACKGROUND OF THE INVENTION

A significant percentage of injectable drugs are administered by using IV containers. Based on a doctor's prescription, pharmacists or caregivers prepare a perfusion, in particular by diluting the drug in an appropriate IV container. In some cases, the drug can also be prediluted in the IV container.

IV containers can, among others be glass bottles, semi-rigid plastic containers or plastic pouches (bags) and have a volume of 50 to 500 ml, whereby larger volumes up to 1000 mL are also possible. They are commonly filled for example with NaCl 0.9% by weight, Glucose 5% by weight or Aqua solution as diluent for the drug.

The perfusion is then administered to the patient using a common and appropriate IV giving set.

With this standard method of administration, it is difficult to guarantee that the total amount of the drug prescribed is quantitatively and effectively transferred to the patient. Indeed, IV containers often have a residual volume (of up to 10 mL) while the giving set (including all components from the transfer spike down to patient IV access) may additionally retain up to 15 mL. In consequence, a potential volume of up to 25 mL does not reach the patient and remains in the IV container and giving set. This lost volume may be significant in comparison to the perfusion volume. Some protocols in hospitals already exist to "flush" the content of the giving set to the patient, for example by using a second IV perfusion or a flush syringe. Both have the inconvenience of not being a closed system, which increases the risk of microbiological contamination and also of puncturing of the container by the needle of the syringe.

U.S. Pat. No. 7,938,816 B2 relates to a medical bag which is intended for the infusion of a medicament by means of gravity.

EP 0 145 825 A1 describes an infusion bag made from double layers of a soft, flexible film.

EP 1 060 754 B1 relates to a perfusion system comprising at least one medicine pocket containing a medicine in solution in a solute, dispensing and perfusion means and at least one rinsing pocket containing a rinsing solute.

EP 2 609 900 A1 discloses an empty medical drug solution container which is formed of a plastic film including seal layers. This medical drug solution container includes a plurality of drug solution storing chambers that are divided so as to be able to communicate; a spare discharge chamber that is formed with a discharge port of a drug solution; liquid-tight dividing means that liquid-tightly divides the plurality of drug solution storing chambers from each other; and non-liquid-tight dividing means that non-liquid-tightly divides at least one of the plurality of drug solution storing chambers from the spare discharge chamber, the non-liquid-tight dividing means has fine pores through which a trace amount of the drug solution or water included in the drug solution can penetrate to the spare discharge chamber, and seals the seal layers so as to be peelable, and the seal layers includes one or more kinds of resins of which the melting point is 130° C. or higher and which is selected from a group consisting of homo-poly-propylene, random-polypropylene, and high-density polyethylene.

BRIEF SUMMARY OF THE INVENTION

The problem of the present invention is to ensure a maximum quantity of a drug being administered to a patient in a perfectly closed sterile system, while simplifying the manufacturing process, facilitating the handling thereof and reducing the risk of particulate contamination.

Said problem in a first embodiment is solved by an integrally molded flexible IV product container with two or more chambers made of two essentially coplanar extending plastic foils for administering a solution, an emulsion and/or a dispersion of a drug to a patient according to claim 1, in particular said container having at least two adjacent chambers divided by peelable seam(s) characterized by
- one medication chamber filled with a diluent suitable for dissolving, emulsifying and/or dispersing a drug or being filled with said prediluted drug.
- at least one or more flushing chamber(s) filled with either
  (a) the same diluent as contained in said medication chamber or
  (b) a diluent different from the one in said medication chamber but being compatible with said diluent and/or said drug respectively intended to be present in said medication chamber or
  (c) a diluent being compatible with said drug prefilled in the medication chamber and
- at least one single opening located in the medication chamber for filling said flushing chamber(s) and said medication chamber with diluent and/or drug.

IV-products in the sense of all aspects of the present invention in particular relate to drugs such as antibiotics, anti-infective and cytostatics, nutritional solutions, vitamins, trace elements or the like.

Figure 1:
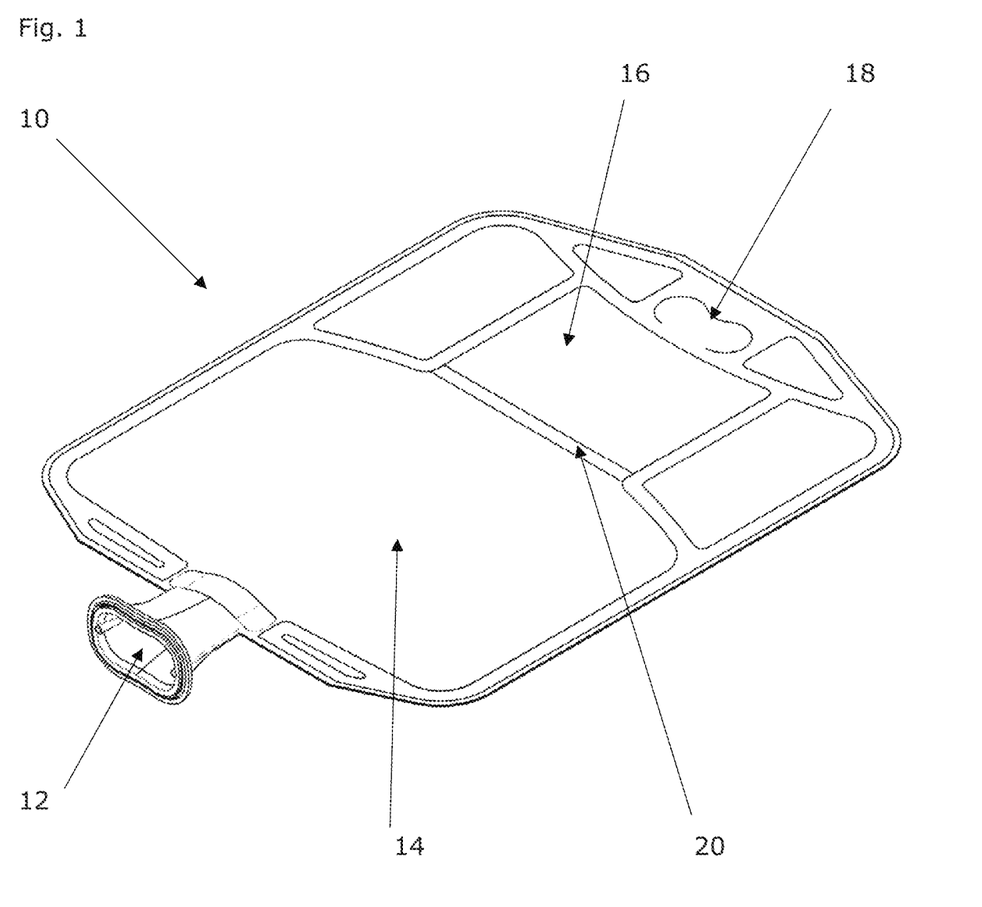
FIG. 1 is a flexible IV container according to one example.

Accordingly, said container has at least two adjacent chambers divided by a substantially peelable seam with a first chamber—referred to as medication chamber—filled with either a diluent suitable for dissolving, emulsifying and/or dispersing said drug or filled with prediluted injectable drug(s), and at least one second chamber—referred to as flushing chamber(s)—filled with said diluent or said diluent being compatible therewith, said second flushing chamber in particular being without any filling opening or port. An appropriate embodiment is shown in FIG. 1.

A preferred embodiment in particular relates to an integrally molded flexible IV container for administering a solution, emulsion, and/or dispersion of a drug to a patient, said container having at least two adjacent chambers divided by peelable seam(s) with at least one medication chamber filled with a diluent suitable for dissolving, emulsifying and/or dispersing the drug or being filled with a drug prediluted in said diluent, said medication chamber having at least one single opening or access for filling said medication chamber with said diluent, for introducing said drug in said medication chamber and for administering the content of said medication chamber to the patient and the at least one or more flushing chamber(s) filled with either the same diluent as contained in the medication chamber or a diluent different from the one in said medication chamber but being compatible with said diluent and/or said drug respectively intended to be present in said medication chamber or a diluent being compatible with said drug prediluted in said medication chamber.

The present invention aims to solve the above-referenced problems by reducing the amount of drug solution that is not effectively dispensed to the patient. This allows for significantly more accurate delivery of the amount of drug prescribed by the doctor. This is particularly important for delicate drugs e.g. antibiotics, anti-infective and cytostatics. Another advantage of the invention is that it is a perfectly closed system. Additionally, compared to the prior art, the invention is easier to manufacture (no valve to insert inside the container which is difficult to use when the chambers are filled with liquid), simpler to use (peel seam to be opened by pressing the films instead of manually breaking a valve with ones fingers) and less prone to contaminate the solution with particulate matter (plastic films do not need to be separated to insert and assemble a valve).

BRIEF DESCRIPTION OF THE DRAWINGS

The present invention is illustrated and described herein with reference to the drawings in which like reference numbers denote like method steps and/or system components, respectively, and in which.

DETAILED DESCRIPTION OF THE INVENTION

In a preferred embodiment, the flexible IV container 10 according to the present invention is characterized in that it contains one single opening 12 only. Preferably, said opening 12 is located in fluid connection to the medication chamber 14, being the largest chamber of the bag depicted in FIG. 1. Said opening 12 is used for filling the medication chamber 14 and said one flushing chamber 16 located next to the upper hanger 18 and divided from the medication by a peelable seam 20. Accordingly, in this embodiment the flushing chamber(s) 16 do not contain any additional opening except the peelable seam 20 until the flushing chamber(s) 16 is/are filled. Said opening 12 may be manufactured in different variations as is principally known to the person skilled in the art. A preferred opening 12 in the medical chamber is shown in FIG. 1 as being an interruption within the contour welding of the container 10. Here, a base port is part of the outer welding of the container. Said opening or access also may be part of the standard IV port system as is known to those skilled in the art.

Although not being bound to the geometry of the flexible IV container 10 according to the present invention said container 10 preferably may be a pouch made of two flexible films circumferentially welded together as shown in FIG. 1.

The invention in particular relates to a flexible IV container (bag) 10 comprising at least two chambers, namely a "medication chamber" 14 of for example 20 to 1000 mL with at least one medication port (to add required drugs if drug not already prediluted) and at least one administration port (to connect the giving set and deliver the solution to the patient) whereby both ports may be part of a single connection device. This single device can also be used to fill both kinds of chambers. In addition to the medication chamber 14 the flexible IV container 10 also contains at least one or more additional "flushing chambers" 16 each having a volume of for example 10 to 500 mL containing the same or a compatible diluent as the one filled in said medication chamber 14. In most cases, the volume of said chamber is less than 100 mL, more preferred less than 50 mL and most preferred in the range of 15 mL to 25 mL. The volume of the flushing chamber(s) 16 should preferably be slightly greater than the total dead volume of the giving set to ensure that the total amount of the drug is administered to the patient. In some cases, especially for hazardous drugs, the total volume of said flushing chamber(s) 16 might be bigger to have a dilution effect. The shape of said flushing chamber(s) 16 preferably should be adapted to easily open the peel seam 20 when a pressure is applied to it.

At least two chambers (14, 16) are separated by a peelable seam 20 that is activated (opened) by pressing on the flushing chamber(s) 16 (compartment) once the complete or the essential amount of the drug has been administered to the patient.

All steps in the first phase of use of this product are the same as current market practice for drug admixture. The caregivers:
  complete all standard checks of their protocol before admixture of the drug with the diluents (if applicable);
  introduce the drug in the "medication chamber" through the medication port (if applicable);
  complete all standard checks of their protocol before administration of the diluted drug to the patient and
  administer the diluted drug using a giving set.

The core of the present invention is realized in the second phase (at the end of the administration, before disconnecting the giving set from the patient and it is important to note that this phase may vary from user to user. Indeed, for example, sometimes the giving set is drained by gravity (caregiver needs to be present) or by using another IV container (needs disconnection/reconnection) or not drained at all and thrown away (loss of drug).

With this present invention, in this second phase, once the drug from the medication chamber 14 has been completely or at least partially administered and the medication chamber 14 of the bag 10 is completely or essentially empty:
  the caregiver activates the flushing chamber(s) 16 by pressing on one or more of said chamber(s) 16 by hand which results in opening the peelable seam(s) 20 in a perfectly sterile and closed system;
  the content of the flushing chamber(s) 16 then flows into the medication chamber 14, rinses its remaining contents and is drained via the giving set, "pushing" the remainder of the dissolved drug contained in the giving set into the patient.

In a preferred embodiment of the invention the flexible IV container 10 is a pouch made of two flexible films circumferentially welded together containing at least two or more chambers.

In another preferred embodiment of the invention the flexible IV container 10 is a bag manufactured by (injection-) stretch blow molding, containing said two chambers.

Said flexible IV container 10 according to the present invention in a further embodiment of the invention is characterized in that the medication chamber 14 and/or the flushing chamber(s) 16 respectively contain a solution of NaCl or Glucose in water. Sodium Chloride and/or Glucose are most frequently used for the dilution and administration of drugs via IV administration.

The content of the solution, emulsion or dispersion of the drug may not be altered to the standard procedure of the hospital. Accordingly, the flexible IV container 10 of the present invention may be characterized in that the volume of the medication chamber 14 is in the range of 20 to 1000 mL, most preferably 50 to 100 mL. Same is true for the flushing chamber 16. Thus, said flexible IV flushing chamber 10 may be characterized in that its content is within a range of 10 to 500 mL, most preferably 15 to 25 mL. Usually, the volume of the flushing chamber(s) 16 is/are smaller than the volume of the medication chamber(s) 14.

The flush option according to the present invention allows for complete delivery of a much more accurate drug dose as prescribed by the doctor, greatly decreasing the drug loss.

From a hygienic point of view, the flush option is perfectly safe as it is a sterile closed system that avoids disconnection/reconnection of a separate flush system and thus avoids the possibility of contaminations. The caregiver has no risk of contaminating himself by splashes resulting from a de- and reconnecting process of the giving set.

The system according to the present invention offers "tamper evidence" to the caregiver to show if the line has been "flushed" or "not flushed" in view of the empty flush chamber and the open seam.

The practice of flushing according to the present invention allows the reuse of giving set (as recommended by hygienists, to reduce disconnection/reconnections close to the patient) by reducing the risk of incompatibility reactions between drugs within the set in the case of multiple drug administration with the same giving set.

As these container systems are dedicated to drug admixture, their label may include a dedicated space where the caregivers can write or stick the mandatory data required in such a practice, typically who did the admixture, when and what was added in which amount.

Compared to the standard current flush practices, the total amount of waste is reduced and the time spent by caregivers to flush the IV lines is reduced.

The manufacturing process for the IV container 10 will generally include standard technologies, as used in the prior art such as preparing a multichamber bag by welding two films and welding peelable and/or non peelable seams 20 for creation of separate chambers (14, 16) and introducing ports for filling and emptying. Following these standard process steps the present invention is characterized in a further embodiment by a manufacturing process of first filling the flushing chamber(s) 16 with a diluent for the drug, said diluent being at least a solvent, emulsifier and/or dispersant, closing the flushing chamber(s) 16 by welding the peelable seam 20, filling the medication chamber 14 with the same diluent or a diluent being compatible with the diluent in the flushing chamber(s) 16 or with a prediluted drug solution, said diluent being at least a solvent, emulsifier and/or dispersant or being compatible with the content of the flushing chamber 16 and finally closing the IV container 10 by welding the circumferential weld or the filling port, including the introduction of a medical port being in connection with the medication chamber 14.

In particular, the manufacturing process for the IV container 10 of the present invention characterized by
  circumferentially welding two (plastic) films (foils) providing one medication chamber 14 and one or more flushing chamber(s) 16 said chambers preliminarily being in fluid connection by an open seam 20,
  first filling said one or more flushing chamber(s) 16 with a diluent being at least a solvent, an emulsion and/or dispersion for a drug to be administered to a patient,
  then closing said open seam 20 by welding and encapsulating the diluent in said one or more flushing chamber(s) 16,
  followed by filling the medication chamber 14 by the opening(s) with
    (a') the same diluent as contained in one or more of said flushing chamber(s) 16 followed by adding a drug to said diluent in the medication chamber 14,
    (b') a diluent for a drug being different from the one in said flushing chamber(s) 16 but being a solvent, an emulsifier, or a dispersant for a drug followed by adding a drug to said diluent in the medication chamber 14 or
    (c') a drug diluted in a solvent, an emulsion or dispersion, containing a drug, closing the opening of said IV container 10 by welding including the optional introduction of one or more medical ports being in connection with said medication chamber 14.

In a further embodiment, the filling of both kinds of chambers is performed through the one same access (opening of the container).

A further embodiment according to the present invention relates to the use of said IV container 10 by essentially or completely emptying said medication chamber 14 to a giving set, followed by opening said peelable seam 20 between the medication chamber 14 and the flushing chamber(s) 16,
  mixing the content of the flushing chamber(s) 16 with the remainder contained in the medication chamber 14 and
  again emptying the combined remaining content of said medication chamber 14 and said flushing chamber(s) 16 to said giving set.

Container systems on the market comprising two chambers are usually filled with two different solutions that are mixed before administration to the patient. In the present invention, both chambers (14, 16) finally are preferably filled with the same solution (most likely NaCl 0.9% by weight or glucose 5% by weight). This specificity allows simplifying the filling process. Indeed, both compartments (14, 16) can be filled through the same access (opening of the container). For example, first 20 mL is filled in the flushing chamber 16 by a filling means preferably being inserted into the interior of the flushing chamber 16 (e.g. to avoid splashes and/or foaming during filling) or by a filling means adapted to the opening 12 that lets the solution flow through medication chamber 14 into the flushing chamber 16 at which point the flushing chamber 16 is closed by welding the peelable seam 20 and then for example filling an additional 50 mL into the medication chamber 14. The filling means may encompass a simple filling nozzle, a filling tube, a syringe or a cannula. This drastically simplifies the filling process (no additional handling or turning of the container system, no sacrificial filling port, etc. is necessary). In a similar way it would be possible to fill the bag with the complete amount of diluent, for example 70 mL, closing the circumferential weld or opening and then welding the peelable seam 20 through the liquid.

The port may use the existing concepts known from the prior art. The product's outer dimensions may be exactly the same as a standard IV bag. This will allow the use of the same raw material and equipment. The technology and standard process steps will be similar to the prior art of standard IV bags. FIG. 1 shows a preferred design of the IV container according to the present invention with a single lower medication chamber 14 to be completely or partially filled with a fluid of 100 mL and an upper flushing chamber 16 to be filled with 20 mL of the same fluid to be contained in the medication chamber 14 divided by a peelable seam 20.

Said IV container 10 also comprises two areas left and right of the flush chamber 16 suitable for marking or other purposes.

In addition thereto additional preferred specificities are worth being described in more detail: It is commonly known to open a peel seam 20 by the generation of pressure in a chamber. In the case of the present invention, at the time when the peel seam 20 has to be opened, only the flushing chamber(s) 16 is (are) filled, meaning that the opening of the peel seam 20 requires the generation of pressure in the flushing chamber(s) 16 by manually pressing on the chamber 16.

It is apparent that manually pressing on standard small volume chamber(s) with two fingers or the heel of a hand would not lead to opening the peel seam 20. Indeed, the liquid would flow on the side within the chamber and the fingers of the user would immediately press one against the other or the heel reaches the surface under the chamber, resulting in the impossibility to increase the pressure in the flushing chamber 16 to open the peel seam 20.

Figure 2:
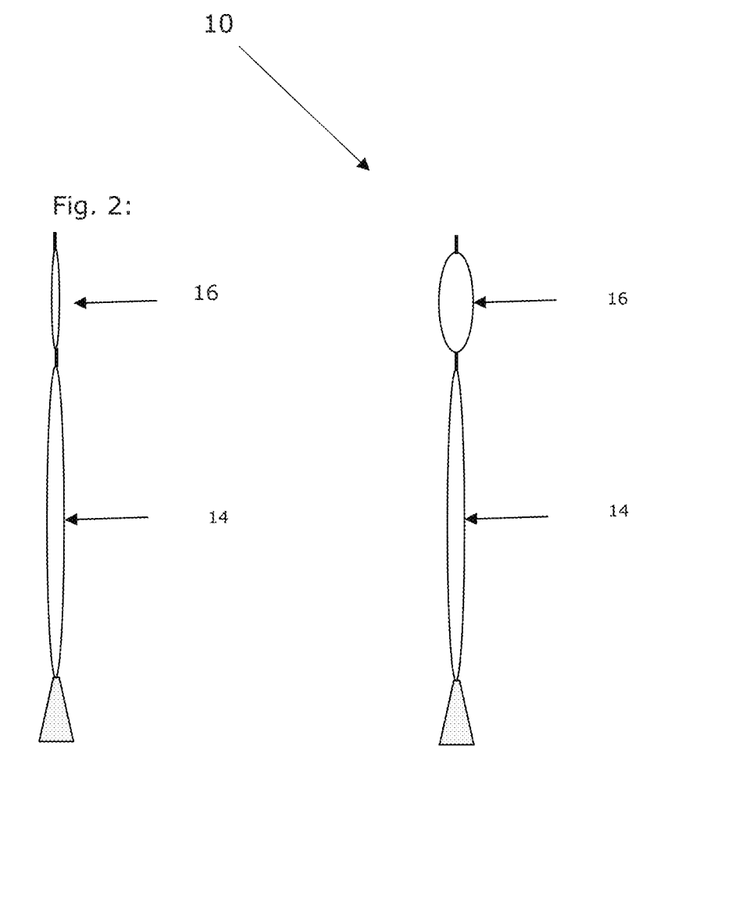
FIG. 2 graphically depicts side profile views of non-thermoformed (left panel) and thermoformed (right panel) flexible IV containers.

It is commonly known that a small volume chamber of an IV bag 10 of less than 100 mL or less than 50 mL (in particular 1 to 50 mL) has a very flat shape. In the case of the present invention, it would typically apply to the flushing chamber 16. This implies that the flush "activation" (opening of the peel-seam 20 between the medication chamber 14 and the flushing chamber(s) 16 by pressing on the flushing chamber 16) when the medication chamber 14 is empty will be somewhat difficult for the caregiver as there is not enough space between the films to apply a pressure high enough to open the peel-seam 20 with certainty. Indeed, in case the caregiver tries to press the flushing chamber(s) 16 with his fingertips it may happen that the pressure is not high enough to open the peel seam 20 despite of a touch of said fingertips. FIG. 2 (left) illustrates the problem.

According to the invention it has been found that pressing manually on a thermoformed flushing chamber 16 ("bubble-like" shape with one or two convex shapes of the foils) simplifies the opening of the peel seam 20 (FIG. 2 (right)). Indeed, the liquid has limited space where to flow when the chamber 16 is more or less filled completely and increasing the pressure between the fingers or the heel of the user will automatically result in increasing the pressure in the flushing chamber 16 and allow in consequence the easy opening of the peel seam 20. On the other hand, there is no necessity to completely fill the flushing chamber(s) 16 with the diluent or to reduce the volume of the flushing chamber(s) 16. The remaining space may be filled with (sterile) air or a protective gas under normal or overpressure. Indeed, with the technical design according to the present invention, the opening process is very intuitive, easy and quick.

To overcome this constraint, it is preferred to thermoform the flushing chamber(s) 16 during the manufacturing of the container 10 before filling, in particular the bag 10 in order to provide more "volume" ("bubble-like" shape).

Thermoforming is a common technology present in many industries, but not in manufacturing of IV primary packaging. Indeed, standard thermoforming processes such as blister packages for tablets, by design, exposes both sides of the plastic film to the atmosphere, which is not acceptable for IV primary packaging. To overcome this constraint, a specific thermoforming process enabling the inner faces of the plastic foils constituting the IV bag to never be exposed to the open atmosphere, has been developed. Two preferred thermoforming process steps options are furthermore described.

Thermoforming as such is of course a well known manufacturing process where a plastic sheet is heated to a pliable forming temperature, formed to a specific shape in a mold, and trimmed to create a usable product. The sheet, film or foil when referring to thinner gauges and certain material types, is heated to a sufficient temperature permitting it to be stretched into or onto a mold to a desired finished shape. Its simplified version is vacuum forming.

In its simplest form, a small tabletop or lab size machine can be used to heat small cut sections of plastic sheet and stretch it over a mold using vacuum or overpressure. This method is often used for sample and prototype parts.

Figure 3:
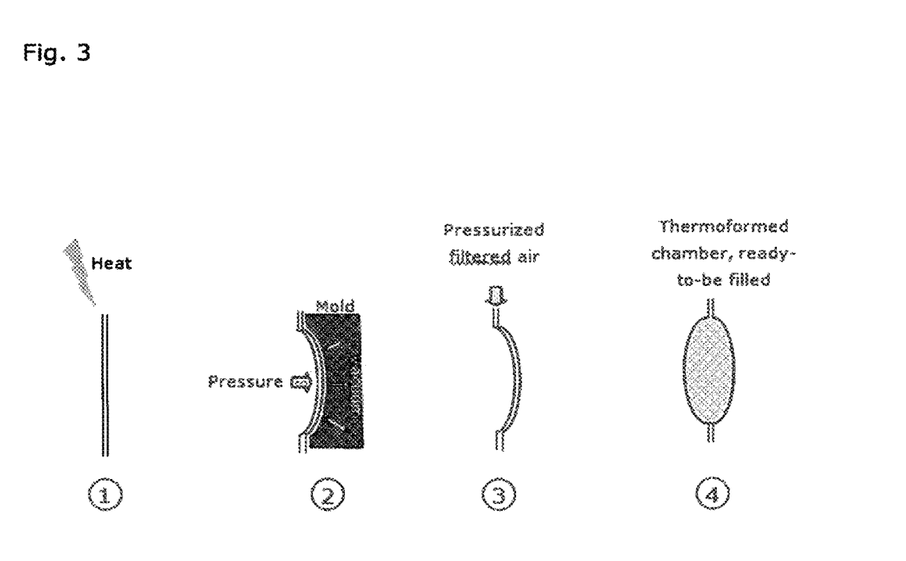
FIG. 3 shows a sequence of thermoforming process steps according to one example.
Figure 4:
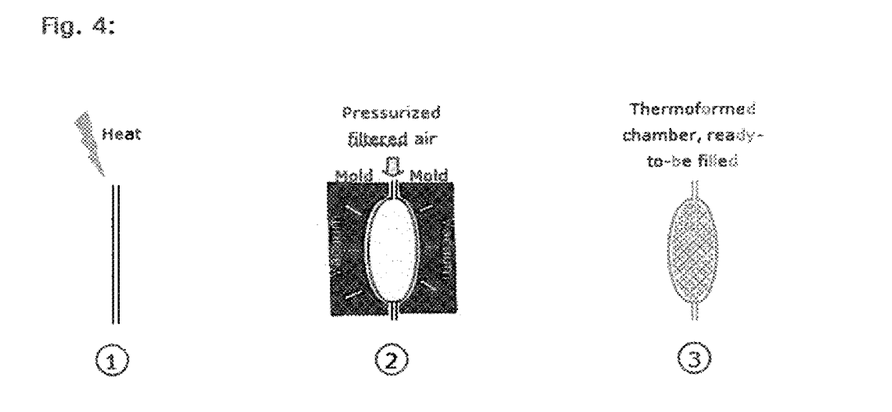
FIG. 4 shows a sequence of thermoforming process steps according to another example.

Thus, thermoforming is usually performed on a single film or foil resulting in exposure of both film sides to the open atmosphere. This simple practice, applied to IV containers according to the present invention would lead to technological and validation challenges, especially concerning particle contamination management. To overcome this difficulty, it is preferred according to the present invention to directly and simultaneously thermoform the upper and lower film at the same time (on the same or opposite site) by vacuum and/or overpressure applied to the outer area of at least on foil of the flushing chamber(s) 16 whilst simultaneously welding the circumferential weld or alternatively in a separate process step. By this method, the inner face of the IV container 10 is thereby never in contact with the open atmosphere. FIGS. 3 and 4 show two options of the sequence of the preferred thermoforming process steps. By said process step sequences, the inner faces of the container films are protected from contact with the open atmosphere and are thus protected from contamination. In both following options as depicted in FIGS. 3 and 4 the initial and end state are similar:

Initial state is the standard "flat" coplanar plastic foils with inner faces one against the other.

End state is open thermoformed chamber (bubble-like), containing air, ready to be filled.

Option 1 is illustrated in FIG. 3:

Step 1 is the thermoforming of both foils on the same side into one mold, using pressure and/or vacuum.

Step 2 is the "opening" of the thermoformed compartment by applying pressure before or during filling into the chamber using for example pressurized sterile filtered air or using directly the solution itself during filling.

Option 2 illustrated in FIG. 4:

The process is made in a single step. Both foils are thermoformed directly to their final position in opposite sides, using two molds (optionally with vacuum) and optionally simultaneously applying pressure into the chamber using for example pressurized sterile filtered air.

Another advantage of thermoforming is that it may reduce potential folds in the bag.

A second aspect of the present invention is directed to a flexible multichamber bag 10 in particular for IV-products with two or more chambers for pharmaceutical and/or nutritional compounds separated by at least one peelable seam 20, made of two essentially co planar extending flat plastic foils, circumferentially welded together, at least one of the chambers having a small volume of less than 100 mL, preferably less than 50 mL, said bag being characterized in that at least one of said two foils in the area of said at least one chamber having said small volume differ from the co planarity bent in a shape providing a curved bubble appearance of at least one foil in an unfilled and/or filled state of said chamber(s).

In one preferred embodiment said small volume chamber is filled with vitamins, trace elements, a concentrated drug and/or unstable compounds.

The manufacturing process of said flexible IV bag is characterized by circumferentially welding two (plastic) films to form two or more chambers separated by at least one peel seam 20, thermoforming of at least one small chamber, then filling independently said chambers with pharmaceutical and/or nutritional compound and/or solvents and/or diluents, closing each chambers by welding or introduction of one or more medical ports being in connection with one of said chambers.

In this respect, it is in particular pointed to WO2011/141315 A1 demonstrating a potential technology for the filling and closure of such a multichamber bag.

A further embodiment according to the present invention relates to the use of said multichamber IV bag 10 by mixing the content of some or all chambers before administration and administering the mixed content to the patient.

In a further embodiment according to the invention the flexible multichamber bag 10 comprises an additional chamber on its top, filled with diluent used to flush the giving set after the administration of the mixed content of the other chambers.

The bubble appearance according to the invention provides a convex outer shape of at least one film relative to the coplanar plain surfaces.

The invention claimed is:

1. A method of using a flexible IV container for administering a solution, emulsion, or dispersion of a drug to a patient, the flexible IV container being integrally molded and thermoformed from an upper film and a lower film, the flexible IV container comprising at least one medication chamber adjacent to at least one flushing chamber, and at least one opening located in the at least one medication chamber, wherein the at least one medication chamber and the at least one flushing chamber are divided by a peelable seam, and wherein the at least one medication chamber is filled with a first diluent suitable for dissolving, emulsifying or dispersing the drug, or a combination of the first diluent and the drug, and the at least one flushing chamber is filled with a:

(a) second diluent identical to the first diluent, or (b) second diluent different from the first diluent but being compatible with said first diluent or said drug, or a combination of the first diluent and the drug, respectively intended to be present in said at least one medication chamber, or (c) second diluent compatible with said drug prediluted in said at least one medication chamber, and wherein the at least one opening is further located within a contour weld of said flexible IV container and is part of an IV port system, the method comprising the steps of:

dispensing contents of said at least one medication chamber to a giving set through the at least one opening;

opening said peelable seam between said at least one medication chamber and said at least one flushing chamber by pressing on the at least one flushing chamber;

transferring contents of said at least one flushing chamber into the at least one medication chamber to rinse the at least one medication chamber; and emptying said at least one flushing chamber and the at least one medication chamber through said giving set to rinse said giving set.

2. The method of claim 1, wherein the flexible container is a pouch made of two flexible films circumferentially welded together.

3. The method of claim 1, wherein said at least one medication chamber or said at least one flushing chamber contains a solution of NaCl or Glucose in water.

4. The method of claim 1, wherein the at least one medication chamber has a volume of 20 mL to 1000 mL.

5. The method of claim 1, wherein the at least one flushing chamber has a volume of 10 mL to 500 mL.

6. The method of claim 1, wherein said at least one flushing chamber is devoid of any opening or access port but separated from said at least one medication chamber by the peelable seam.

7. The method of claim 1, wherein a single port is mounted in the opening for filling said at least one medication chamber with the first diluent or the combination of the first diluent and the drug, said port also being suitable for administering contents of said flexible IV container to the patient.

8. The method according to claim 1, further comprising the step of completely delivering a dissolved drug contained in the giving set to a patient.

9. A method of using a flexible multichamber bag thermoformed from an upper foil and a lower foil, the flexible multichamber bag comprising:

two or more chambers for a pharmaceutical compound or a nutritional compound, or a combination of a pharmaceutical compound and a nutritional compound, the two or more chambers separated by at least one peelable seam made of the upper foil and the lower foil that are essentially coplanar extending flat plastic foils, circumferentially welded together, wherein at least one of the two or more chambers has a small volume of less than 100 mL, wherein at least one of said two foils, in an area of said at least one of the two or more chambers, differs from a co-planarity bent in a shape providing a curved bubble appearance of said two foils in an unfilled and filled state of said two or more chambers, wherein the flexible multichamber bag comprises an additional chamber filled with diluent used to essentially flush a giving set after administration of mixed content from the two or more chambers, the method comprising the steps of:

mixing the content of one or more of the two or more chambers before administration to form a mixture;

essentially emptying at least one of the two or more chambers; and administering the mixture to a patient.

10. The method according to claim 9, wherein said additional chamber has a blister-like or bubble-like single or double convex appearance of the upper film and the lower film obtainable by thermoforming the upper film and the lower film.

11. The method according to claim 9, said flexible multichamber bag further comprising a single opening located in one of the two or more chambers, wherein said single opening is an interruption within a contour welding of said flexible multichamber bag.

12. The method according to claim 9, wherein at least one of the two or more chambers has a small volume of less than 50 mL.

13. The method according to claim 9, wherein at least one of the two or more chambers has a small volume of 15 mL to 25 mL.

14. The method according to claim 9, wherein each of the two or more chambers is filled with a pharmaceutical, a nutritional compound, a solvent, a diluent, or a combination thereof.

15. The method according to claim 9, wherein the at least one of the two or more chambers is filled with vitamins, trace elements, a concentrated drug, unstable compounds, or a combination thereof.

\* \* \* \* \*